(12) United States Patent
Lindemann et al.

(10) Patent No.: US 6,934,764 B2
(45) Date of Patent: Aug. 23, 2005

(54) METHOD OF CONVERTING A NETWORK ADDRESS

(75) Inventors: Werner Lindemann, Mülheim (DE); Norbert Schönfeld, Dortmund (DE); Frank Wulf, Neuss (DE)

(73) Assignee: Siemens Aktiengesellschaft, Munich (DE)

( * ) Notice: Subject to any disclaimer, the term of this patent is extended or adjusted under 35 U.S.C. 154(b) by 806 days.

(21) Appl. No.: 09/883,811

(22) Filed: Jun. 18, 2001

(65) Prior Publication Data

US 2002/0010796 A1 Jan. 24, 2002

(30) Foreign Application Priority Data

Jun. 16, 2000 (DE) ........................................ 100 29 792

(51) Int. Cl.[7] ........................ G06F 15/16; G06F 15/173
(52) U.S. Cl. ...................................... 709/245; 709/238
(58) Field of Search ............................... 370/466–467; 709/238–242

(56) References Cited

U.S. PATENT DOCUMENTS

| | | | |
|---|---|---|---|
| 5,995,503 A | * 11/1999 | Crawley et al. | 370/351 |
| 6,006,258 A | 12/1999 | Kalajan | |
| 6,173,334 B1 | 1/2001 | Matsuzaki et al. | |
| 6,434,618 B1 | * 8/2002 | Cohen et al. | 709/228 |
| 6,493,765 B1 | * 12/2002 | Cunningham et al. | 709/245 |
| 6,611,873 B1 | * 8/2003 | Kanehara | 709/238 |
| 6,704,295 B1 | * 3/2004 | Tari et al. | 370/270 |
| 6,751,221 B1 | * 6/2004 | Saito et al. | 370/392 |

FOREIGN PATENT DOCUMENTS

| | | |
|---|---|---|
| JP | 01 112 577 A | 5/1989 |
| WO | 99/21340 | 4/1999 |

OTHER PUBLICATIONS

Guruprasad, V., "Who needs addresses?", IBM T J Watson Research Center, Yorktown Heights, NY 10598, USA, p 403–413, Oct. 2–4, 2000.*
"Network Address Translation Technical Discussion", Network Safety, p 1–4, Apr. 18, 1996.*
Walter Puls: "HICOM—das erste ISDN–Kommunikationssytem für private Netze" [HICOM—the first ISDN communication system for private networks], in *ISDN im Büro—HICOM* [*ISDN in the office—HICOM*], Siemens Aktiengesellschaft, Berlin and München, 1985, pp. 26–37.
Eun–Sang Lee et al.: "An Expanded NAT with Server Connection Ability", *1999 IEEE TENCON*, pp. 1391–1394.
K. Egevang et al.: "The IP Network Address Translator (NAT)", XP–002246214, pp. 1–10.

* cited by examiner

*Primary Examiner*—Jason D. Cardone
*Assistant Examiner*—Minh–Chau Nguyen
(74) *Attorney, Agent, or Firm*—Laurence A. Greenberg; Werner H. Stemer; Ralph E. Locher

(57) ABSTRACT

On receiving a message in a communications device, a sender or destination network address is checked to determine whether the network address is intended for address conversion. In cases in which the network address is intended for address conversion, a received virtual destination network address is converted to a communications-device-internal destination network address, or a received communications-device-internal sender network address is converted to a virtual sender network address.

9 Claims, 4 Drawing Sheets

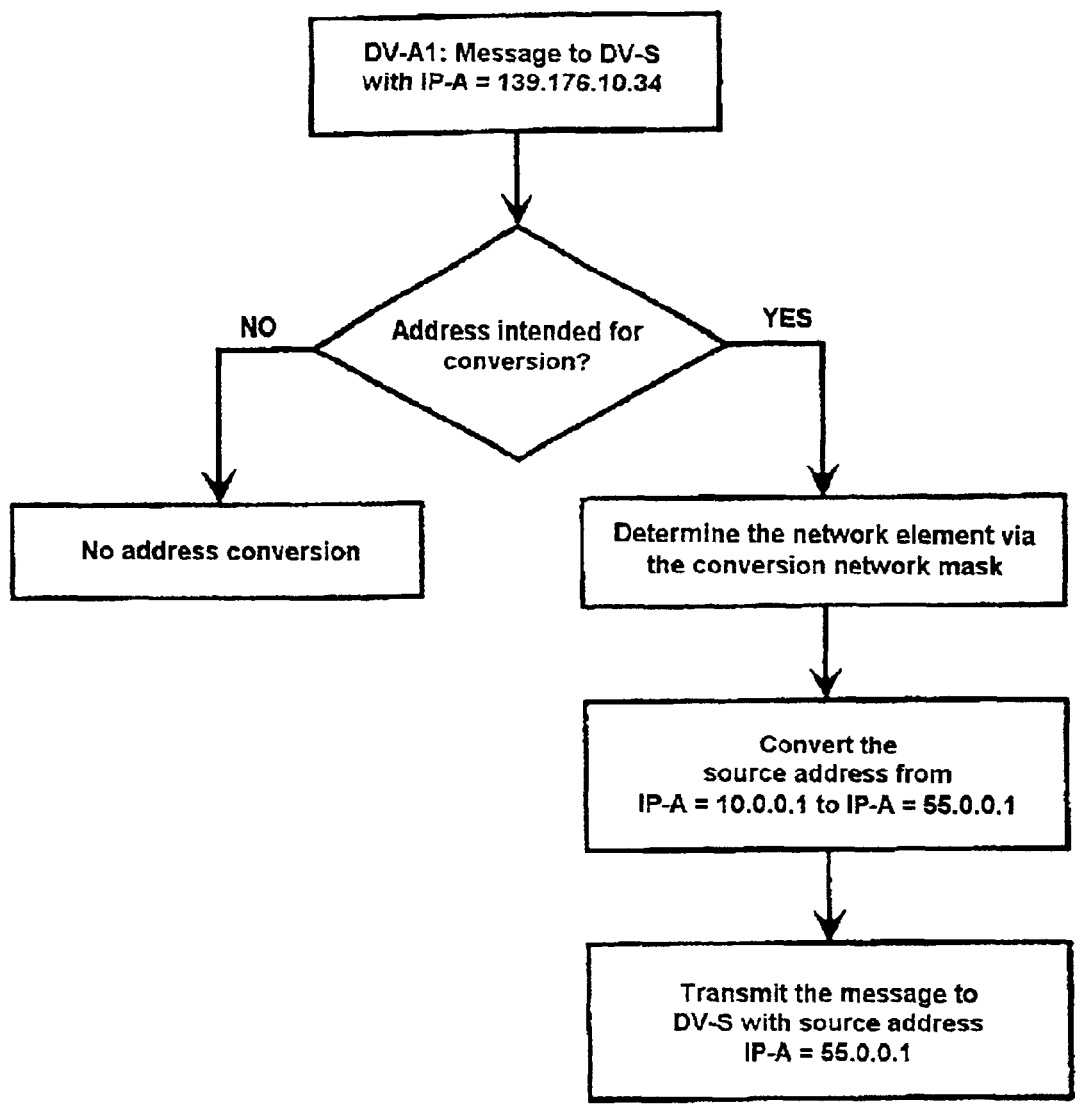

METHOD OF CONVERTING A NETWORK ADDRESS

BACKGROUND OF THE INVENTION

Field of the Invention

The invention lies in the communications technology field and pertains, more specifically, to a method for the conversion of a network address.

A communications system which is configured for information transmission, in particular for voice data transmission, is known from the product document "Sonderausgabe telcom report und Siemens Magazin Com: ISDN im Büro—HICOM" [Special issue telcom report and Siemens Magazine Com: ISDN in the Office—HICOM], Siemens AG, Berlin and Munich, 1985, in particular from pages 26–37. The communications system comprises an operational and data server which is integrated in the communications system and by means of which the communications system is administered—remote administration and remote maintenance—from an external service center. Data are thereby exchanged bidirectionally between the service center and the communications system via, for example, a public communications network, by means of appropriate modems.

In addition to the conventional, voice-data-oriented access units, modern communications systems generally have access to a computer network, for example a local area network LAN. The connection to the computer network is thereby provided by a separate peripheral assembly. A communications system having such a computer network access assembly is known, for example, from commonly assigned German patent application No. 199 46 504 (European published patent application EP 1 089 530 A2).

The devices—for example personal computers—which are connected to a computer network, and the computer network itself, are in this case normally addressed using an IP address (IP=Internet Protocol) associated with the respective device or via a network address associated with the computer network. The IP address uniquely identifies the devices connected to the computer network, or the computer network itself, in which case the IP addresses can be allocated individually by a communications system administrator. In the context of such a computer network, the literature frequently refers to a private address area for specific IP addresses—defined by the RFC (Request For Comments).

The individual allocation of IP addresses by the communications system administrator results in a problem in that computer networks connected to different communications systems, and the devices connected to the computer network, are assigned the same IP addresses and thus, from outside the communications system, the IP addresses can no longer be uniquely associated with a device or a computer network. For this reason, when administering a computer network or a device connected to the computer network from the service center, it is necessary for a device which controls the setting up of connections in the service center—frequently referred to as a router in the literature—to be manually appropriately reconfigured before each connection is set up, so that a connection is set up to the appropriate device to be administered. However, if there are a large number of devices to be administered, this is associated with considerable complexity.

SUMMARY OF THE INVENTION

The object of the present invention is to provide a method of converting a network address which overcomes the above-noted deficiencies and disadvantages of the prior art devices and methods of this general kind, and which allows the complexity for administration to be reduced, or even avoided completely.

With the above and other objects in view there is provided, in accordance with the invention, a method of converting a network address, which comprises:

on receiving a message in a communications device, checking a sender network address to determine whether a sender network address is intended for address conversion, and if the sender network address is intended for address conversion, converting a received destination network address to a communications-device-internal network address.

A major advantage of the method according to the invention is that the method according to the invention can easily be integrated in existing systems.

In accordance with an added feature of the invention, the network address is an IP address.

In accordance with an additional feature of the invention, a conversion address mask stored in a communications device is used to determine which parts of the destination network address need to be converted to the communications-device-internal network address.

In accordance with another feature of the invention, for the check as to whether address conversion is to be carried out, a list with network addresses intended for address conversion is stored in the communication device.

In accordance with a further feature of the invention, for the check as to whether address conversion is to be carried out, a determination is made of the route via which a link to the communication device has been set up.

In accordance with again an added feature of the invention, the communication device is a communications system providing access to a computer network to be administered, and the sender network address is used to identify a data processing device associated with a service center.

In accordance with again an additional feature of the invention, addressing of the computer network to be administered and of the devices which are connected to the computer network and are to be administered is carried out from the service center via a virtual network address which uniquely identifies the computer network or those devices which are connected to the computer network.

In accordance with again another feature of the invention, for transmitting a response message from a device which is associated with the computer network, a check is carried out to determine whether the network address of the data processing device which is associated with the service center is intended for address conversion, and, in situations in which this is the case, the network address of the device which is connected to the computer network is converted to a service-center-compatible virtual network address.

In accordance with a concomitant feature of the invention, the conversion address mask which is stored in the communication device is used to determine which parts of the network address of the device which is associated with the computer network are to be converted into the service-center-compatible virtual network address.

One advantage of these refinements of the invention is, inter alia, that manual reconfiguration of the router device in the service center can be avoided by assigning virtual network addresses and converting the network addresses used in the course of a connection, in a central device associated with the devices to be administered.

Other features which are considered as characteristic for the invention are set forth in the appended claims.

Although the invention is illustrated and described herein as embodied in a method for conversion of a network address, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a flowchart illustrating the major method steps which take place when transmitting a message from the device to be administered to the data processing device associated with the service center.

DESCRIPTION OF THE PREFERRED EMBODIMENTS

Figure 1:
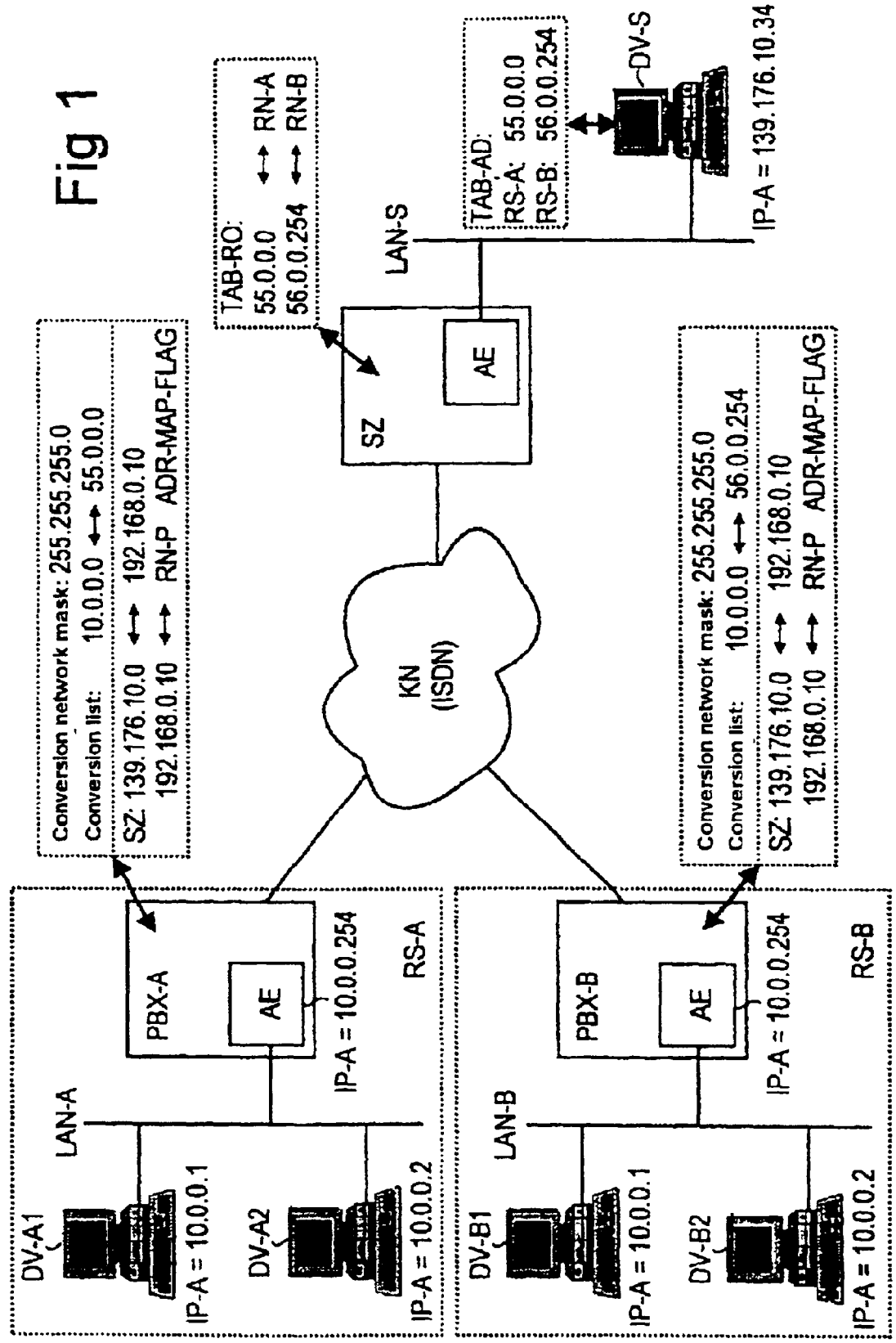
FIG. 1 is a structural diagram which schematically illustrates a first exemplary embodiment of the major functional units involved with the method according to the invention.

Referring now to the figures of the drawing in detail and first, particularly, to FIG. 1 thereof, there is seen a structogram schematically illustrating a first exemplary embodiment of the invention of the major functional units involved with the method according to the invention. In this case, a service center SZ, a first communications system PBX-A and a second communications system PBX-B are connected to one another via a communications network KN, for example an ISDN-oriented communications network (indicated by the ISDN in brackets). A service network LAN-S, with data processing devices connected to it, is connected via an access unit AE to the service center SZ. By way of example, the illustration shows a data processing device DV-S—referred to as a service computer DV-S in the following text—with an associated IP address IP-A=139.176.10.34.

Furthermore, a first computer network LAN-A is connected to the first communications system PBX-A, and a second computer network LAN-B, with data processing devices connected to it, is connected to the second communications system PBX-B. By way of example, a first and a second data processing device DV-A1, DV-A2 are illustrated for the first computer network LAN-A, and a first and a second data processing device DV-B1, DV-B2 are also illustrated for the second computer network LAN-B. The arrangement to be administered from the service center SZ and comprising the first communications system PBX-A, the first computer network LAN-A and the data processing devices DV-A1, DV-A2 connected to it, is referred to in the following text as the first remote system RS-A. The arrangement comprising the second communications system PBX-B, the second computer network LAN-B and the data processing devices DV-B1, DV-B2 connected to it is referred to in the following text as the second remote system RS-B.

Both the first and the second computer networks LAN-A, LAN-B have the same associated network addresses IP-A= 10.0.0.x in the respective remote system RS-A, RS-B. In this case, the access unit AE which provides the access for the computer network LAN-A, LAN-B to the respective communications system PBX-A, PBX-B is—in accordance with the normally used conventions—in each case allocated to IP address 10.0.0.254. The first and the second data processing devices DV-A1, DV-A2, DV-B1, DV-B2 of the respective computer networks LAN-A, LAN-B are respectively allocated the IP addresses IP-A=10.0.0.1 or IP-A=10.0.0.2.

For unique addressing of the first and second computer networks LAN-A, LAN-B from the service center SZ, the first computer network LAN-A is allocated the virtual IP address IP-A=55.0.0.0 in the service center, and the second computer network LAN-B is allocated the virtual IP address IP-A=56.0.0.254. In addition, a table TAB-AD is stored in the service computer DV-S which is connected to the service network LAN-S, in which table the devices to be administered by the service center SZ are listed. By way of example, an entry is shown for the first remote system RS-A, and an entry for the second remote system RS-B. The IP address IP-A=55.0.0.0 is stored for administration of the first remote system RS-A, and the IP address 56.0.0.254 is stored for administration of the second remote system RS-B.

In combination with a network mask 255.255.255.0—not shown—the storage of the IP address IP-A=55.0.0.0 associated with the first remote system RS-A defines the fact that the entire first computer network LAN-A is intended for administration by the service center SZ. On the other hand, the storage of the IP address IP-A=56.0.0.254 associated with the second remote system RS-B defines the fact that only the access unit AE which provides access for the second computer network LAN-B to the second communications system PBX-B is intended for administration by the service center SZ.

Furthermore, what is referred to as a routing table TAB-RO is stored in the service center for setting up connections between the service center SZ and the first or second communications system PBX-A, PBX-B, which table includes the call numbers RN-A, RN-B, which are associated with the virtual addresses IP-A=55.0.0.0, IP-A =56.0.0.254 of the first and second remote systems RS-A, RS-B respectively, for setting up connections via the communications network KN to the respective communications system PBX-A, PBX-B associated with the remote system RS-A, RS-B.

A conversion list and a conversion network mask for conversion of the addresses in the respective remote system RS-A, RS-B are stored both in the first communications system PBX-A and in the second communications system PBX-B. An association, which is defined in the course of any address conversion to be carried out, between the communications-system-internal network address and the virtual network address is stored in the conversion list. Matching the service center SZ, the virtual network address IP-A=55.0.0.0 associated with the communications-system-internal network address IP-A=10.0.0.0 is stored in the first remote system RS-A for the first computer network LAN-A. The virtual network address IP-A=56.0.0.254 associated with the communications-system-internal network address IP-A=10.0.0.0 is stored in the second remote system RS-B for the second computer network LAN-B.

A network mask provides a general definition as to which of the 4 bytes of an IP address IP-A—formed in accordance with version IPv4—identify the computer network LAN-A, LAN-B—frequently referred to as the network element in the literature—and which identify the devices DV-A, DV-B connected to the computer network LAN-A, LAN-B, or identify the access unit AE—frequently referred to as the host element in the literature—which provides the access for the computer network LAN-A, LAN-B to the respective communications system PBX-A, PBX-B. By way of example, a conversion network mask 255.255.255.0 is illustrated, which defines the fact that the first 3 bytes of an IP address IP-A—network element—identify the respective computer network LAN-A, LAN-B, and the fact that the fourth byte of an IP address IP-A—host element—identifies a device DV-A, DV-B, AE which is connected to the respective computer network LAN-A, LAN-B. Since the byte values 0 and 255—as is indicated on the basis of the illustrated conversion network mask 255.255.255.0—are each allocated a special significance, a maximum of 254 devices connected to a computer network LAN-A, LAN-B can in consequence be addressed by means of the present network mask 255.255.255.0—by the IP addresses IP-A =10.0.0.1 to IP-A=10.0.0.254.

In the present exemplary embodiment, the first and the second computer networks LAN-A, LAN-B are each addressed by the first 3 bytes of a respective IP address IP-A, that is to say by means of the addresses 10.0.0.x (x=0, ..., 255). The access units are identified uniquely—in accordance with the normally used conventions—by the fourth byte of the corresponding IP address IP-A= 10.0.0.254, the first data processing device DV-A1, DV-B1 is identified uniquely by the fourth byte IP-A=10.0.0.1, and the second data processing device DV-A2, DV-B2 is identified uniquely by the fourth byte IP-A=10.0.0.2.

Alternatively, it is possible to use a network mask 255.255.0.0 for addressing the devices DV-A, DV-B, AE, connected to a computer network LAN-A, LAN-B to reserve two (or even more) bytes of an IP address IP-A. This is the situation when more than 254 devices are intended to be connected to a computer network LAN-A, LAN-B. Furthermore, a network mask 255.255.255.128 also allows only parts of the fourth byte—for example only the last 7 bits—of an IP address IP-A to be reserved for addressing the devices DV-A, DV-B, AE connected to a computer network LAN-A, LAN-B. This is worthwhile, for example, when forming what are referred to as subnetworks and when, for example, a maximum of 128 devices are intended to be connected to a computer network LAN-A, LAN-B.

Furthermore, routing entries for bidirectional data interchange between the respective remote system RS-A, RS-B and the service center SZ via the communications network KN are stored both in the first communications system PBX-A and in the second communications system PBX-B. In this case, a further network address IP-A=192.168.0.10 is stored such that it is associated with the network address IP-A=139.176.10.0 stored for a setting up process with the service network LAN-S. This further network address IP-A= 192.168.0.10 uniquely identifies, for example, a non-illustrated network node in the communications network KN to which a message is transmitted from one of communications systems PBX-A, PBX-B and from which the message is passed on autonomously to the service center SZ. Such a network node is referred to as an ISDN partner in the following text. For setting up a connection from the respective communications system PBX-A, PBX-B to the ISDN partner—or the network node in the communications network KN—a partner call number RN-P which is associated with the ISDN partner in the communications network KN is stored in addition to the further network address IP-A= 192.168.0.10 associated with the ISDN partner. According to the first exemplary embodiment of the invention, the network addresses IP-A=192.168.0.10 intended for address conversion are identified by an appropriate conversion identification ADR-MAP-FLAG.

If the call number RN-S of the service center SZ is available directly in the respective communications system PBX-A, PBX-B, the conversion identification ADR-MAP-FLAG can be allocated directly to the network address IP-A=139.176.10.0 of the service center SZ.

Figure 2:
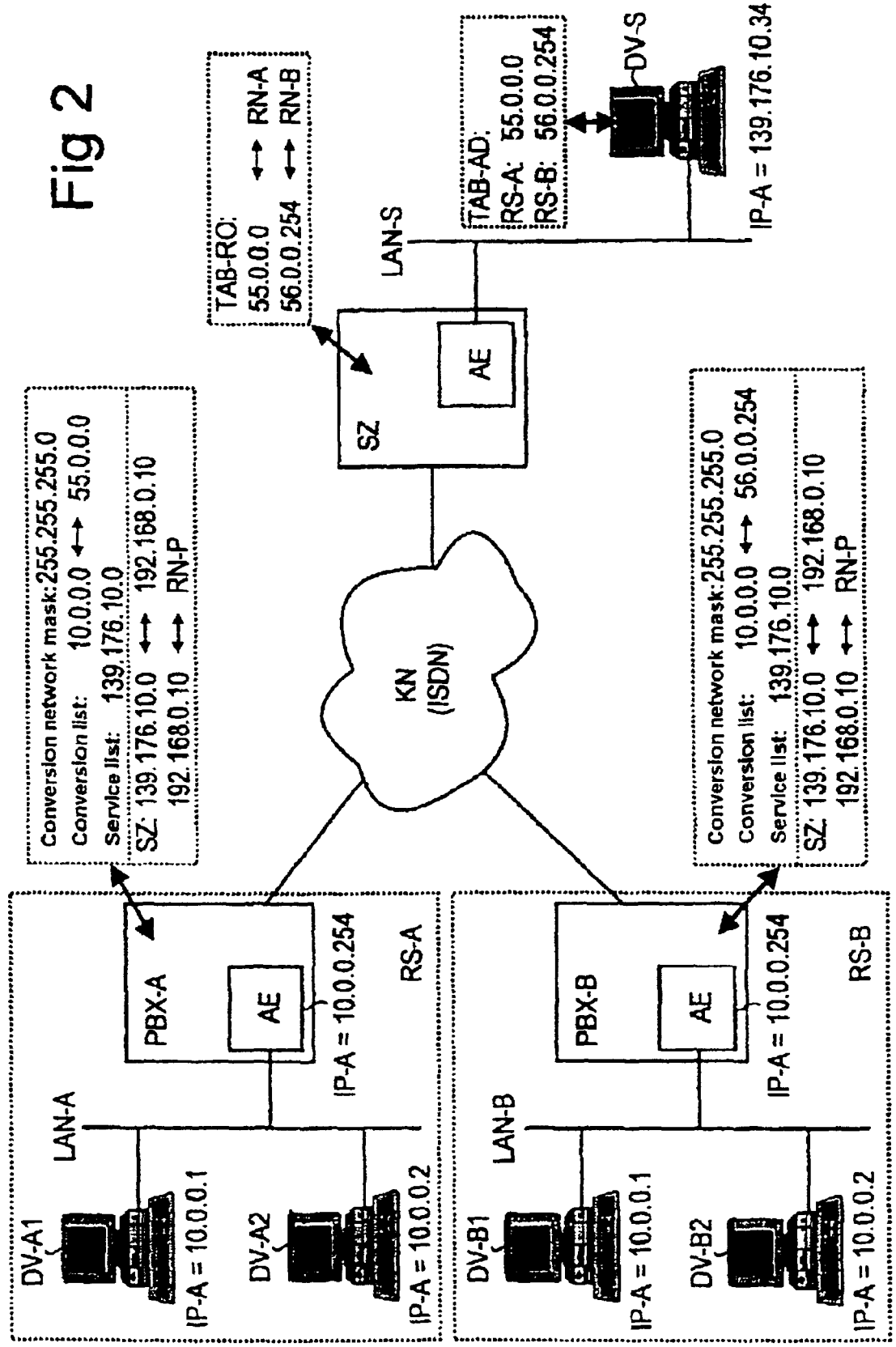
FIG. 2 is a structural diagram which schematically illustrates a second exemplary embodiment of the major functional units involved with the method according to the invention.

Referring now to FIG. 2, there is shown a structogram which schematically illustrates a second exemplary embodiment of the invention of the major functional units involved with the method according to the invention. The second exemplary embodiment of the invention differs from the first exemplary embodiment only in that a decision as to whether address conversion is to be carried out is not made on the basis of the route selected for setting up a connection between the service center SZ and the respective communications system PBX-A, PBX-B, that is to say this is not done using an ISDN partner involved in the connection. In contrast to the first exemplary embodiment, a service list with the sender network addresses intended for address conversion is, in the second exemplary embodiment, stored in each of the communications systems PBX-A, PBX-B. By way of example, the illustration shows a service list with an entry for the service network LAN-S having the network address IP-A=139.176.10.0. There is thus no need to use a conversion identification ADR-MAP-FLAG in this exemplary embodiment. The service list allows deliberate selection or exclusion of service computers DV-S connected to the service network LAN-S for administration of a respective remote system RS-A, RS-B, in a simple manner.

The address conversion process according to the invention will be described in more detail in the following text using the example of the first remote system RS-A and with reference to FIGS. 1 and 2.

Figure 3:
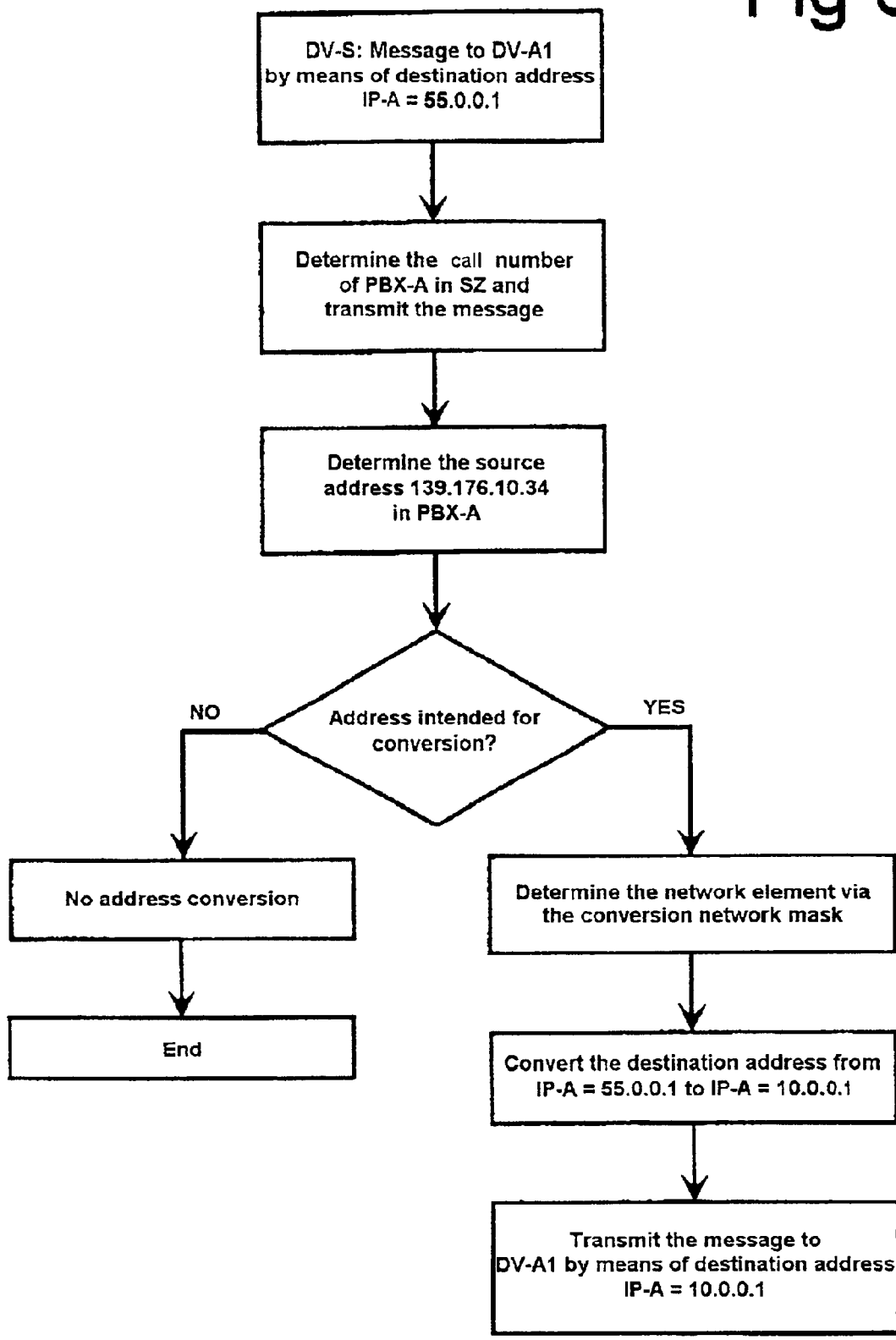
FIG. 3 is a flowchart illustrating the major method steps which take place when transmitting a message from a data processing device associated with the service center to a device which is to be administered.

The flowchart of FIG. 3 illustrates the major method steps which take place when transmitting a message—for example which is to be transmitted in the course of administration—from the service computer DV-S to the first data processing device DV-A1 in the first remote system RS-A. In order to transmit a message to the first remote system RS-A, the virtual IP address IP-A=55.0.0.0 for the first computer network LAN-A is determined from the table TAB-AD stored in the service computer DV-S. After this, a message is transmitted to the first remote system RS-A by means of the IP address IP-A=55.0.0.1—referred to as the virtual destination address in the following text—which identifies the first data processing device DV-A1 in the first remote system RS-A. The call number RN-A associated with the virtual IP address IP-A=55.0.0.0 is determined in the service center SZ by means of the routing table TAB-RO stored there, and this call number RN-A is used to set up a connection to the first communications system PBX-A via the communications network KN.

An identification and authentication procedure is then started in the first communications system PBX-A. Access to communications-system-internal data and services is in this case allowed only after successful identification and authentication of the service computer DV-S, of the service center SZ, or of the subscriber using the service computer DV-S in the first communications system PBX-A. In this case, the service computer DV-S can be identified, for example, via the IP address IP-A=139.176.10.34 associated with the service computer DV-S in the service network LAN-S. Authentication can be carried out, for example, by the user who is using the service computer DV-S transmitting a password.

After successful identification and authentication of the service computer DV-S, of the service center SZ or of the subscriber using the service computer DV-S in the first communications system PBX-A, the source address IP-A=139.176.10.34 (which corresponds to the IP address of the service computer DV-S) is determined in the first communications system PBX-A, and a check is then carried out to determine whether the received source address IP-A=139.176.10.34, and the service network LAN-S identified by the received source address IP-A=139.176.10.34, are intended for address conversion.

According to the first exemplary embodiment of the invention, the check to determine whether address conversion is to be carried out takes place on the basis of the route via which a connection is set up between the service center SZ and the first communications system PBX-A, that is to say the ISDN partner via which the connection has been set up. Using the routing entries, described with reference to FIG. 1, in the first communications system PBX-A, the source address IP-A=139.176.10.34 is used to determine that the connection has been set up via the ISDN partner whose network address is IP-A=192.168.0.10. A check is carried out in a next step to determine whether the conversion identification ADR-MAP-FLAG is set for this ISDN partner.

According to the second exemplary embodiment of the invention, the check to determine whether address conversion is to be carried out takes place on the basis of a service list in which the source addresses intended for address conversion are stored.

If the source address is not intended for address conversion, that is to say no conversion identification ARD-MAP-FLAG (exemplary embodiment 1) is set for an ISDN partner which has been determined, or if the source address is not entered in the service list (exemplary embodiment 2), the method is ended.

If, on the other hand, and as stated in the two exemplary embodiments, the source address is intended for address conversion, the conversion network mask 255.255.255.0 is used to determine the network and the host element of the virtual destination address IP-A=55.0.0.1 to be converted. In a next step, the network element of the virtual destination address IP-A=55.0.0.x is replaced by the network element of the communications-system-internal destination address IP-A=10.0.0.x, thus resulting in a communications-system-internal destination address IP-A=10.0.0.1. Finally, the message is transmitted by the first communications system PBX-A, using the converted destination address IP-A=10.0.0.1, to the first data processing device DV-A1 in the first remote system RS-A.

In the case of the second remote system RS-B, a check of the host element is carried out in addition to the address conversion of the network element. If, for example, the service computer DV-S uses the IP address IP-A=56.0.0.1 to address the first data processing device DV-B1 in the second remote system RS-B, the host element is additionally converted from IP-A=10.0.0.1 to IP-A=10.0.0.254 in the second communications system PBX-B in addition to the address conversion of the network element from IP-A=55.0.0.1 to IP-A=10.0.0.1, so that only the access unit AE intended for administration can be addressed.

The flowchart of FIG. 4 illustrates the major method steps which take place when transmitting a response—for example which is to be transmitted in the course of administration—from the first data processing device DV-A1 in the first remote system RS-A to the service computer DV-S. The service computer DV-S is in this case addressed by means of the destination address IP-A=139.176.10.34 which is transmitted in the course of the message and identifies the service computer DV-S. In a next step, a check is carried out to determine whether address conversion is to be carried out for this destination address IP-A=139.176.10.34 in the first communications system PBX-A.

According to the first exemplary embodiment of the invention, the check to determine whether address conversion is to be carried out takes place on the basis of the route via which a connection is to be set up between the first communications system PBX-A and the service center SZ, that is to say the ISDN partner via which the connection is to be set up. The routing entries, which have been described with reference to FIG. 1, in the first communications system PBX-A are used to determine, by means of the destination address IP-A=139.176.10.34, that the connection is to be set up via the ISDN partner whose network address is IP-A=192.168.0.10. In a next step, a check is carried out to determine whether the conversion identification ADR-MAP-FLAG is set for the ISDN partner identified by the IP address IP-A=192.168.0.10.

According to the second exemplary embodiment of the invention, the check to determine whether address conversion is to be carried out takes place on the basis of the service list in which the network addresses intended for address conversion are stored.

If the destination address IP-A=192.168.0.10 is not intended for address conversion, that is to say no conversion identification ADR-MAP-FLAG is set (exemplary embodiment 1) for an ISDN partner which has been determined, or if the source address is not entered in the service list (exemplary embodiment 2), the response is transmitted with the source address IP-A=10.0.0.1 to the service computer DV-S.

If, in contrast, the destination address IP-A=192.168.0.10—as stated in the two exemplary embodiments—is intended for address conversion, the conversion network mask 255.255.255.0 is used to determine the network and host element of the communications-system-internal source address IP-A=10.0.0.1 to be converted. In a next step, the network element of the communications-system-internal IP address IP-A=10.0.0.1 is replaced by the network element of the virtual IP address IP-A=55.0.0.x, resulting in a virtual source address IP-A=55.0.0.1. In situations in which the connection between the first communications system PBX-A and the service center SZ no longer exists, the routing entries which are stored in the first communications system PBX-A—in particular the partner call number RN-P—are used to set up a connection to the service center SZ via the communications network KN, and the response is transmitted together with the converted source address IP-A=155.0.0.1 to the service computer DV-S.

We claim:

1. A method of converting a network address, which comprises:

on receiving a message in a communications system providing access to a computer network to be administered, checking a sender network address to determine whether a sender network address is intended for address conversion;

if the sender network address is intended for address conversion, converting a received destination network address to a communications-device-internal network address;

using the sender network address to identify a data processing device associated with a service center; and addressing from the service center, the computer network to be administered and the devices connected to the computer network to be administered, via a virtual network address, the virtual network address uniquely identifying the computer network or the devices connected to the computer network.

2. The method according to claim 1, which comprises, for transmitting a response message from a device associated with the computer network, checking whether the network address of the data processing device associated with the service center is intended for address conversion; and if the data processing device is intended for address conversion, converting the network address of the device connected to the computer network to a service-center-compatible virtual network address.

3. The method according to claim 2, which comprises using the conversion address mask stored in the communications device to determine which parts of the network address of the device associated with the computer network are to be converted into the service-center-compatible virtual network address.

4. The method according to claim 2, which comprises using the conversion address mask stored in the communications device to determine which parts of the network address of the device associated with the computer network are to be converted into the service-center-compatible virtual network address.

5. The method according to claim 1, wherein the network address is an IP address.

6. The method according to claim 5, which comprises using a conversion address mask stored in a communications device to determine which parts of the destination network address need to be converted to the communications-device-internal network address.

7. The method according to claim 1, which comprises basing the checking step, as to whether address conversion is to be carried out, on a list with network addresses intended for address conversion stored in the communications device.

8. The method according to claim 1, wherein the checking step, as to whether address conversion is to be carried out, includes determining a route via which a link to the communications device has been set up.

9. A method of converting a network address, which comprises:

on receiving a message in a communications system providing access to a computer network to be administered, checking a sender network address to determine whether a sender network address is intended for address conversion;

if the sender network address is intended for address conversion, converting a received destination network address to a communications-device-internal network address;

using the sender network address to identify a data processing device associated with a service center;

for transmitting a response message from a device associated with the computer network, checking whether the network address of the data processing device associated with the service center is intended for address conversion; and if the data processing device is intended for address conversion, converting the network address of the device connected to the computer network to a service-center-compatible virtual network address.

* * * * *